United States Patent
Noda (10) Patent No.: US 8,642,126 B2
(45) Date of Patent: Feb. 4, 2014

(54) CARBON NANOTUBE DEVICE AND PROCESS FOR PRODUCING THE SAME

(75) Inventor: Suguru Noda, Tokyo (JP)

(73) Assignee: Dainippon Screen Mfg. Co., Ltd. (JP)

( * ) Notice: Subject to any disclaimer, the term of this patent is extended or adjusted under 35 U.S.C. 154(b) by 1665 days.

(21) Appl. No.: 11/572,665

(22) PCT Filed: Jul. 26, 2005

(86) PCT No.: PCT/JP2005/013629
§ 371 (c)(1),
(2), (4) Date: Jun. 19, 2007

(87) PCT Pub. No.: WO2006/011468
PCT Pub. Date: Feb. 2, 2006

(65) Prior Publication Data
US 2007/0231486 A1 Oct. 4, 2007

(30) Foreign Application Priority Data
Jul. 27, 2004 (JP) ................................. 2004-219371

(51) Int. Cl.
*H01J 9/02* (2006.01)
(52) U.S. Cl.
USPC ....... 427/249.6; 313/266; 445/35; 423/447.3; 977/939; 977/843
(58) Field of Classification Search
USPC ............. 427/249; 313/266; 445/35; 977/939; 977/843; 423/447.3
See application file for complete search history.

(56) References Cited

U.S. PATENT DOCUMENTS

| 5,973,444 | A  | * | 10/1999 | Xu et al. ....................... 313/309 |
| 6,400,091 | B1 | * | 6/2002 | Deguchi et al. ............ 315/169.1 |
| 6,590,322 | B2 | * | 7/2003 | Hsu ............................... 313/310 |
| 2002/0024279 | A1 | * | 2/2002 | Simpson et al. .............. 313/309 |

FOREIGN PATENT DOCUMENTS

| JP | 11-139815 | 5/1999 |
| JP | 2000-090809 | 3/2000 |

(Continued)

OTHER PUBLICATIONS

Dai, Carbon Nanotubes: Synthesis, Integration, and Properties, Acc. Chem. Res. 2002; 35: 1035-1044.*

(Continued)

*Primary Examiner* — Daniel C McCracken
(74) *Attorney, Agent, or Firm* — Ostrolenk Faber LLP (57) ABSTRACT

A carbon nanotube device has a substrate (1), a layer (3) having a space (5) which penetrates in the vertical direction of the substrate (1), and carbon nanotubes (7) formed on the surface of the substrate facing the space (5) in such a manner as to have number density distributions successively changed according to the distances from the center of the space (5), the supply amount of catalyst substances is diluted by supplying the catalyst substances through an opening of a coating film (4) opposite to the substrate (1) and the hole (5), a catalyst having a nominal thickness distribution according to the way how the space (5) appears is formed on the substrate (1) facing the space (5), and a carbon source is supplied, thereby forming carbon nanotubes having the number density distribution are formed on the substrate (1).

16 Claims, 5 Drawing Sheets

(56) References Cited

FOREIGN PATENT DOCUMENTS

| | | |
|---|---|---|
| JP | 2001-126609 | 5/2001 |
| JP | 2002-203473 | 7/2002 |
| JP | 2003-031116 | 2/2003 |
| JP | 2003-288835 | 10/2003 |
| JP | 2004-253236 | 9/2004 |
| JP | 2004-359478 | 12/2004 |
| JP | 2005-276601 | 10/2005 |

OTHER PUBLICATIONS

Dai, Carbon nanotubes: opportunities and challenges, Surface Science 2002; 500: 218-241.*

Wei, et al., Effect of catalyst film thickness on carbon nanotube growth by selective area chemical vapor deposition, Applied Physics Letters 2001; 78(10): 1394-1396.*

Kinloch, I.A., et al., "High-throughput screening for carbon nanotube production," *Carbon*, 42(1), 101-110 (2004).

* cited by examiner

CARBON NANOTUBE DEVICE AND PROCESS FOR PRODUCING THE SAME

TECHNICAL FIELD

The present invention relates to a carbon nanotube device and a process for producing the same.

More particularly, provided are a carbon nanotube device that has carbon nanotubes at a specific number density distribution in a layer having a space which penetrates in a substrate vertical direction on a substrate, and a process for producing a carbon nanotube device which supports nano-sized catalyst particles under a condition such that the catalyst particles do not cause coarsening, has good quality carbon nanotubes, enables fine structure control, and is suitable for the structure of a field emission electron source.

BACKGROUND ART

To produce a carbon nanotube device having carbon nanotubes distributed on a substrate, it is necessary to provide metal nanoparticle catalysts on the substrate. Such a technique is disclosed in the following literatures.

Non Patent Literature 1: kinloch, I. A.; Shaffer, M. S. P.; Lam, Y. M.; Windle, A. H. Carbon 2004, 42, 101

Patent Literature 1: Unexamined Japanese Patent Application KOKAI Publication No. 2000-090809

Patent Literature 2: Unexamined Japanese Patent Application KOKAI Publication No. 2003-288835

Conventionally, there are proposed a scheme of disposing metal nanoparticle catalysts made beforehand on a substrate, and a scheme of supporting a catalyst substance on a substrate to spontaneously form a metal nanoparticle catalyst.

The former scheme has an advantage such that the size of the metal nanoparticle catalysts can be controlled according to an objective carbon nanotube, and the latter scheme has an advantage of facilitating catalyst support, so that both schemes are used for the purpose of fabricating a device like a semiconductor device, a field emission display electrode which use carbon nanotubes.

In using the metal nanoparticle catalysts made beforehand, however, there is a problem such that the metal nanoparticle catalysts may cause aggregation and coarsening under a high temperature of synthesizing carbon nanotubes.

The scheme of spontaneously forming the metal nanoparticle catalysts has a problem such that searching of an appropriate support condition of a catalyst is difficult.

On the other hand, [Non Patent Literature 1] discloses that the combinatorial scheme is effective for efficiently searching the support condition of a catalyst.

In any schemes, however, only a part of a metal on the substrate functions as a catalyst, and there is a problem such that lots of catalysts are mixed as impurities in carbon nanotubes.

Accordingly, a technique of efficiently searching a catalyst support condition to form carbon nanotubes on a substrate, and a technique of forming carbon nanotubes that have little amount of catalyst substances mixed as impurities are desired.

Moreover, desired in forming a device is a process for producing a carbon nanotube device which enables fine structure control, and is suitable for the structure of a field emission electron source.

In addition, an important application of carbon nanotubes on a substrate is a field emission electron source used for a display or the like. To that end, it is necessary to control and form the pattern of carbon nanotubes directed in a substrate vertical direction

[Patent Literature 1] discloses a scheme of fixing carbon nanotubes made beforehand at an objective position on a substrate, and [Patent Literature 2] discloses a scheme of depositing catalyst substances at an objective position on a substrate to thereby synthesize carbon nanotubes.

According to the scheme of [Patent Literature 1], however, because the controllability of the direction of the carbon nanotubes which form a pattern is low so that only a part of the carbon nanotubes function as an electrode, and because electrical connection between carbon nanotubes and the substrate is bad, the property of a device is not always good from the standpoint of life duration and power consumption.

On the other hand, according to the scheme of [Patent Literature 2], because carbon nanotubes are uniformly formed on a pattern, electrical field enhancement on the carbon nanotubes is not likely to occur, the extraction voltage is high, only a part of the catalyst substance functions as the catalyst, and impurity mixing in the carbon nanotubes is large.

DISCLOSURE OF INVENTION

Problem to be Solved by the Invention

Therefore, a new technology is necessary to overcome the foregoing problems. It is thought that carbon nanotubes grow up with metal nanoparticles functioning as a catalyst, which have the same diameter as that of the cross section of carbon nanotubes. The producing processes thereof are mainly divided into production on a substrate and production in a gas-phase, but regarding the former production, a supporting scheme of a catalyst often becomes a problem.

That is, this is because that the synthesis condition of carbon nanotubes is a high temperature like approximately 1000° C., and 600° C. at least, metal nanoparticles on a substrate cause aggregation, coalescence, and coarsening in such a condition, and it is difficult to ensure the size thereof in nano-size. This problem is particularly noticeable in carbon nanotubes having a small diameter.

On the other hand, it is thought that metal atoms come to have a shape close to equilibrium within a range (surface diffusion length) where metal atoms, clusters, or particles move on a substrate. In particular, in the case of island growth on a uniform substrate, the equilibrium form should be a single particle structure. However, a surface diffusion length changes largely depending on a combination of materials of substrate/metal, a substrate temperature, and the like, so that prediction is difficult in the present circumstances.

Thus, the present inventors or the like thought that if only little amount of metals are present in a surface diffusion length, those gather and form a nano-sized single particle, and decided to search a condition where nano-sized catalyst particles can be supported without causing coarsening, by forming a layer having a space which penetrates in a substrate vertical direction on a substrate supporting a catalyst, using the layer as a mask with holes having different sizes, and changing the deposition rate of a metal widely in accordance with the size of the hole and the thickness of the layer. Through this method, when a catalyst metal having a nominal thickness equivalent of 0.001 nm to 1 nm was supported on a substrate, a carbon source was supplied to the catalyst, and chemical vapor deposition was carried out by using a space which penetrated in the substrate vertical direction was used as a space which regulated the growth of carbon nanotubes, fabrication of good carbon nanotubes was succeeded.

The bottom portion of the space in the substrate vertical direction opened in the layer on the substrate, that is, a structure that carbon nanotubes are formed on the surface of the substrate can be used as a field emission electron source. Because the density of a catalyst substance decreases from the center thereof toward the periphery at the bottom portion of the space, the number density of carbon nanotubes can be increased at the center, and the carbon nanotubes entwined with one another were grown m the substrate vertical direction.

Further, production of a carbon nanotube device which has electrically connected carbon nanotubes and an extraction electrode, and is suitable for the structure of a field emission electron source was succeeded by providing multiple layers on a substrate, to be more precise, by forming a conductive layer on the substrate, causing a layer thereon having a space to function as an insulating material, and forming a conductive layer thereon.

Means for Solving the Problem

That is, the subject matter of the invention is a carbon nanotube device that has a layer having a space which penetrates in a substrate vertical direction with the layer being contacted with the substrate, and carbon nanotubes, which have number density distributions successively changing according to distances from the center of the space, on the surface of the substrate facing the space.

Another subject matter is a process for producing a carbon nanotube device of forming a layer having a space which penetrates in a substrate vertical direction on a substrate, supplying a catalyst substance from the opposite side of the substrate through the space of the layer to dilute the supply amount of the catalyst substance, forming a catalyst having a nominal thickness distribution according to the way how the space appears on the substrate facing the space, and supplying a carbon source, thereby forming carbon nanotubes having a number density distribution on the substrate.

The other subject matter is a process for producing a multilayer structure carbon nanotube device of causing a layer having a space to function as an insulating material, and providing a conductive layer between a substrate and the layer with the space and/or on the opposite side of the substrate while contacting the layer with the space.

Effects of the Invention

The invention is useful for a process for fabricating a carbon nanotube device which causes good carbon nanotubes to grow up at an arbitrary location on a substrate.

It is important as an analysis method which finds out the best catalyst support condition from the broad range of metal deposition rates at one experiment despite a reaction condition, and the values as a production process and a production device are high.

The carbon nanotubes themselves grown on the substrate can select the nominal thickness distribution pattern of a catalyst substance formed on the substrate, the carbon nanotubes formed at the center of the pattern can entwine with one another, can grow in the substrate vertical direction, not in the substrate surface horizontal direction, thereby making it possible to fabricating a device formed in a needle-like shape.

At this time, because the needle of carbon nanotubes is formed at the bottom portion of the space opened in the substrate vertical direction in the layer on the substrate, a device with this structure can be directly used as an electrode of a field emission display, or can be used as the probe of a scanning probe microscope or an information reading/writing device of a recording device by eliminating the layer having the space.

In particular, because catalyst support in an appropriate amount becomes possible, mixing of impurities in carbon nanotubes is extremely less, and this is very important for the application of the device.

Further, when a fine pattern is formed in a multilayer structure on the substrate using photolithography, an array of carbon nanotubes can be formed. Multilayer structure formation is somehow complicated, but formation of a fine pattern (down to several tens nm) becomes possible, this enables densification, and more particularly, a fine structure used as a mask can be directly used as a device structure in a field emission electron source, so that there is an advantage such that a process is simplified.

EXPLANATION OF REFERENCE NUMERALS

1 Substrate
2 Conductive film
3 Insulating film
4 Coating film
5 Hole
6 Catalyst substance
7 Spiny carbon nanotube aggregate

BEST MODE FOR CARRYING OUT THE INVENTION

Embodiments of the invention will be explained below. Note that embodiments explained below are just for explanation, and are not intended to limit the scope of the invention. Therefore, a person skilled in the art can employ embodiments which replace each structural component or all components with equivalent ones, and those embodiments should be included in the scope of the invention.

First Embodiment

Figure 1:
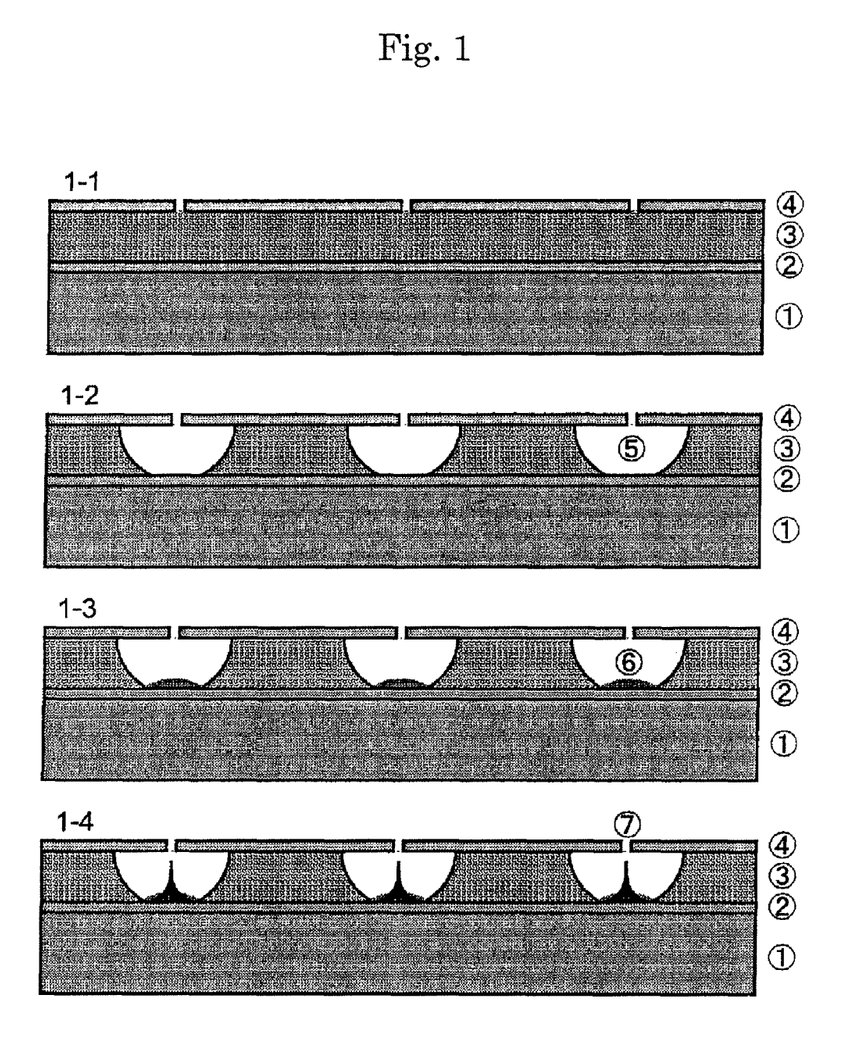
FIG. 1 A schematic diagram illustrating the production steps of a carbon nanotube device.

FIG. 1 is a cross-sectional view illustrating the structure of a carbon nanotube device in production steps according to an embodiment of the invention.

The carbon nanotube device of the embodiment has a conductive film (2) formed on a substrate (1), an insulating film (3) with holes (5) formed on the conductive film, and a coating film (4) formed on the insulating film. Catalyst substances (6) are used in the production steps, and spiny carbon nanotube aggregates (7) extend from the conductive film (2) exposed with respect to the holes (5) toward the tiny openings of the coating film (4).

Note that the coating film (4) may be omitted. The substrate (1) and the conductive film (2) may be considered as one "substrate" as a whole. In this case, the conductive film (2) which is a surface of the "substrate" is exposed by the holes (5). In a case where it is considered that the substrate (1) and the conductive film (2) are separate demonstratively, the holes (5) also erode the conductive film (2), so that the surface of the substrate (1) is directly exposed. Catalyst supports may be remained at portions of the bottom faces of the catalyst substances (6) to ensure electrical connection between the catalyst substances (6) and the conductive film (2). A typical spiny carbon nanotube aggregate (7) is composed of single-walled carbon nanotubes, but is not limited to this type of carbon nanotubes. Modified examples thereof will be discussed later.

To facilitate understanding, in the following explanation, the hole (5) is called as "space" and the various films are called as "layers" appropriately, explanations will be given with reference to the numerals in the figure while specifying the materials of those layers, and, words such as "aggregate" and "spiny" will be omitted arbitrarily.

As typical materials, a silicon substrate with an oxide film is used for the substrate (1), a titanium nitride film is used for the conductive film (2), a silicon dioxide film is used for the insulating film (3), a conductive chrome film is used for the coating film (4), and Co, Fe, Mo, or the like is used for the catalyst substance (6). Hereinafter, detailed explanations including a case where other materials are used will be given.

(Substrate)

A possible substrate (1) for forming the carbon nanotube device varies depending on the kind of the device, but is one that can withstand a high temperature greater than or equal to 600° C. which is a carbon nanotube synthesizing condition, and is generally a silicon substrate or a silica glass substrate which can be easily obtained with a high purity, to specifically avoid undesirable effects originating from mixing of impurities. When the insulating layer (3) is necessary, a surface of the silicon substrate (1) may be oxidized, and a formed oxide coat may be used, and when electrical connection with the carbon nanotubes (7) is necessary, a conductive layer (2) may be formed on the substrate (1).

(Catalyst Support)

In this step, the layer (3) having the spaces (5) which penetrate in the vertical direction of the substrate (1) is formed on the substrate (1), more than or equal to one catalyst substance is provided from the opposite side of the substrate (1) through the spaces (5) to dilute the supply amount of the catalyst substance, and a catalyst pattern having a nominal thickness distribution according to the way how the space (5) appears is formed.

A possible layer (3) having the space (5) which runs in the vertical direction of the substrate (1) is a layer normally in 100 to 10000 nm, the material of which is not specified, but is easily formed on the substrate (1) by plasma CVD or the like, and the desired space (5) is easily formed by hydrofluoric acid solution etching or the like, and further, silicon dioxide is preferable in view of the insulation property.

In addition to the layer (3) having the space which penetrates in the substrate vertical direction, the layer (2) of a 10 to 1000 nm conductive material like titanium nitride provided between the substrate (1) and the layer (3) having the space which penetrates in the substrate vertical direction, and the layer (4) of a 10 to 1000 nm conductive material like chrome provided on the layer (3) having the space which penetrates in the substrate vertical direction may be formed by sputtering and used for a multilayer structure formed on the substrate (1), as necessary.

The former conductive material layer (2) is effective as an etch stop layer in performing hydrofluoric acid solution etching and a diffusion barrier layer for the catalyst and the substrate.

The latter conductive material layer (4) whose surface is undergone photolithography and in which an opening with a desired size is formed by etching is useful as a material for forming the space (5) having a desired size in the layer (3) to have the space (5) by etching through the opening.

Specifically, as illustrated in FIG. 1-1, a titanium nitride film (2) is formed on a monocrystalline silicon substrate (1) with a thermal oxide film by reactive sputtering, a silicon dioxide film (3) is formed thereon by plasma CVD, and a metal chrome film (4) is formed by sputtering. A resist agent is applied on the chrome film (4) with such a multilayer structure (not illustrated), and etching is performed, thereby obtaining a structure body which has openings in desired shape, size and number in the film (4).

Subsequently, as illustrated in FIG. 1-2, the structure body in which the openings are formed is undergone hydrofluoric acid solution etching, and a hydrofluoric acid solution introduced through the openings contacts and dissolves the silicon dioxide film (3), and forms the holes (5) in the silicon dioxide film, thereby completing a layer having spaces which penetrate in the substrate vertical direction.

Next, as illustrated in FIG. 1-3, when catalyst substances are deposited by sputtering or the like from a deposition source (not illustrated) disposed on the opposite side of the substrate from the completed structure body serving as a mask, the patterns of the catalyst substances having nominal thickness distributions are formed on the surface of the titanium nitride film (2) at the bottom portions of the holes (5) in the silicon dioxide film.

A possible catalyst substance is a transition metal, particularly, iron, cobalt, nickel, molybdenum, or the like. As the condition of the sputtering, a temperature is a room temperature, and a pressure is selected from a range of 0.1 to 10 Pa, and the substrate may be heated.

In sputtering, because a distance between a sputter cathode and the metal chrome film (4) which functions as a mask can be taken long enough with respect to the mean free path of a molecule, catalyst atoms repeat collision with other atoms and molecules, and enter into the openings of the chrome film (4) at all angles. On the other hand, because the chrome film (4) is disposed right above the substrate in such a manner as to have an appropriately tiny clearance, the catalyst atoms which have passed through the openings do not collide with other atoms and molecules, linearly fly, reach and deposit on the substrate (1).

In the case illustrated in FIG. 1-3, the catalyst atoms reach and deposit on the surface of the titanium nitride film (2) at the bottom portions of the holes (5) in the silicon dioxide film.

At this time, a deposition rate is proportional to the solid angle of a mask opening from each point on the substrate (when the titanium nitride film or the like is provided on the substrate, "substrate" means a film surface. The same is true in the following explanation), the smaller the opening is and the larger the distance between the substrate and the mask is, the slower the deposition rate becomes. By performing deposition for a certain time, the catalyst patterns having nominal thickness distributions according to the way how passages appear is formed on the substrate (1).

In a condition where the catalyst atoms collide with other atoms and molecules when flying from the mask opening to the substrate, the nominal thickness of the catalyst substances is controlled by a diffusion process, but because a pattern having a nominal thickness which decreases as it becomes away from the mask opening can be formed in this case too, this becomes an effective catalyst support method.
(Formation of Carbon Nanotubes)

In this step, the substrate which supports the catalyst substances by the foregoing method is used and carbon nanotubes are synthesized by chemical vapor deposition Possible carbon sources are hydrocarbons, such as methane and acetylene, carbon monoxide, and alcohols, such as ethanol and methanol, and from the standpoint of the quality of carbon nanotubes and the ease of handling of a source, using alcohols is preferable.

Reaction conditions in chemical vapor deposition are selected from a range of 600° C. to 1200° C. in temperature and 0.001 atm to 1 atm in pressure, and a reaction time is normally within a range from 1 second to 1 hour.

Nanoparticle catalysts having the same diameter as that of carbon nanotubes are required for synthesis of the carbon nanotubes. In particular, in case of single-walled carbon nanotubes remarked because of the superior physical property, because the diameter thereof is small, nanoparticle catalysts having an extremely small size like 1 nm or so are necessary.

According to chemical vapor deposition, however, because a reaction temperature is a high temperature like approximately 1000° C., even if nanoparticle catalysts having a size of 1 nm or so can be prepared on a substrate, catalyst particles are likely to cause coarsening due to surface diffusion, aggregation, and coalescence under the condition of chemical vapor deposition, and synthesis of single-walled carbon nanotubes using the coarse catalyst particles was difficult.

It is said that the coarsening of catalyst particles depends on an extent (surface diffusion length) how far a catalyst substance can diffuse on the surface of a substrate. That is, because catalyst substances present within the range of the surface diffusion length gather to form a catalyst particle, the amount of the catalyst substances prepared on the substrate beforehand may be adjusted in such a way that catalyst particles have objective sizes when formed.

This allows the catalyst substances to perform surface diffusion, form nanoparticle catalysts each having a diameter of 1 nm or so, and react with hydrocarbon or alcohol which are the source of carbon nanotubes, thereby causing single-walled carbon nanotubes to grow under the high temperature condition of chemical vapor deposition.

It is, however, difficult to predict a surface diffusion length beforehand, and as a result, the nominal thickness of the catalyst substance to be prepared beforehand cannot be predicted. Therefore, a method of using a large number of samples (libraries) of the catalyst substances having nominal thicknesses changed systematically for a wide range becomes effective.

The libraries to be specifically prepared vary depending on the various conditions of chemical vapor deposition and the various conditions of supporting catalyst substances, but for cobalt catalysts, if the thickness of the layer which has spaces on the substrate is 1000 nm or so, the patterns of various nominal thicknesses of catalysts obtained at the bottom portions of the spaces having holes with sizes changed in several stages within a range of 100 to 1000 nm were effective for searching the best condition.

Possible evaluation schemes are plan-view observation by a field emission scanning electron microscope, microscopic Raman scattering spectroscopy, and the like.
(Carbon Nanotube Device)

A carbon nanotube device of the invention has a substrate, a layer which contacts the substrate and has spaces that penetrate in the substrate vertical direction, and carbon nanotubes, which have number density distributions successively changing according to a distance from the center of the space, on the surface of the substrate which faces the spaces.

This is not irrelevant to the catalyst pattern on a substrate where the carbon nanotubes are grown.

Figure 2:
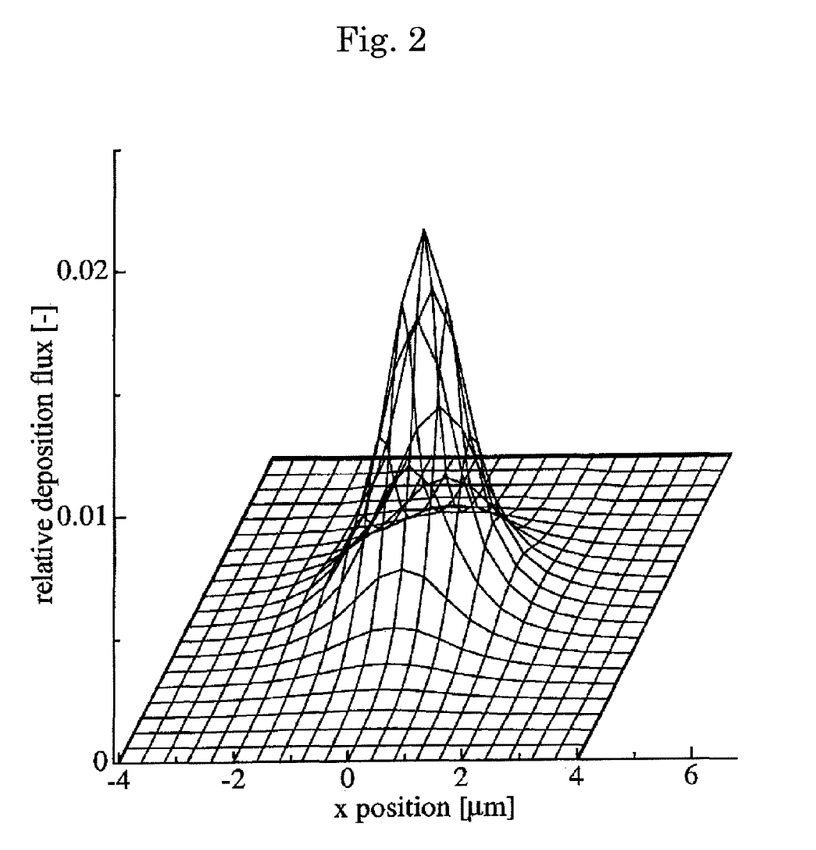
FIG. 2 A distribution chart illustrating the distributions of catalyst deposition amounts.

As illustrated in FIG. 2, the nominal thickness distribution of a catalyst normally indicates the maximum value at the center of the bottom portion of the space, and decreases as the distance from that position becomes large.

Figure 3:
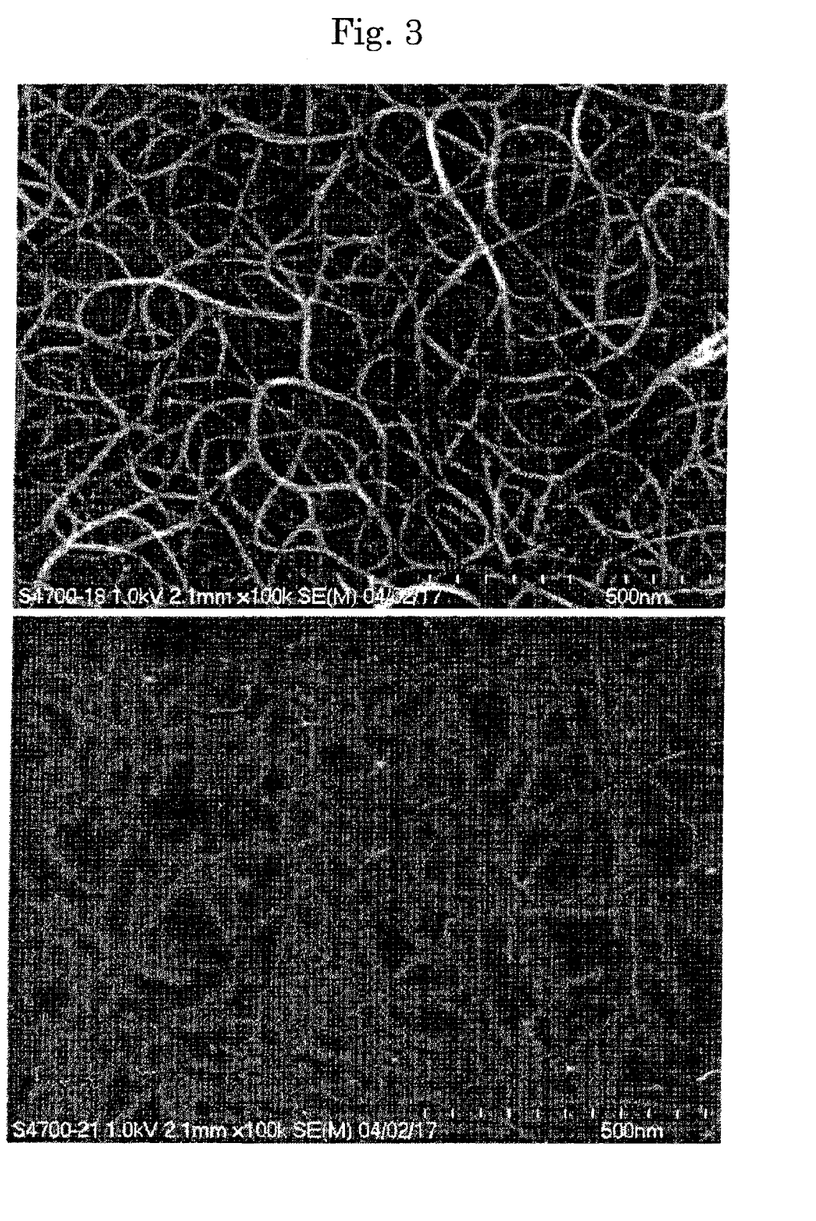
FIG. 3 An explanatory diagram illustrating results of the plan-view of carbon nanotubes by a field emission scanning electron microscope.

On the other hand, as illustrated in FIG. 3, the number density of the carbon nanotubes, in particular, single-walled carbon nanotubes, which grow over the catalyst, can be controlled by the nominal thickness of the catalyst. The same characteristic is true for devices.

In a case where a layer having a plurality of spaces in the same shapes is used to form a large number of patterns of catalyst substances having exactly the same nominal thickness distributions, the number density distribution patterns of carbon nanotubes growing at the bottom portions of the spaces become the same. When a plural kinds of patterns of the catalyst substances having different nominal thickness distributions are formed by changing the deposition rate for individual holes, the number density distribution patterns of the carbon nanotubes growing on the substrate become a plural kinds accordingly.

As mentioned above, there are two kinds of schemes which are a scheme of providing the coating layer (4), and forming the carbon nanotubes by utilizing the openings thereof and the holes (5), and a scheme of not providing the coating layer (4) and forming the carbon nanotubes by utilizing the holes (5) only.

In the case of the former scheme, dominant parameters largely affect the distribution of the catalyst nominal thickness and the number density distribution pattern of the carbon nanotubes are the shape and size of the opening of the coating film (4) and the thickness of the coating film (4).

In contrast, in the case of the latter scheme, the shape and size of the hole (5) itself, and the largeness of the aperture of the hole (5) with respect to the insulating film (3) become dominant parameters which largely affect the distribution of a catalyst nominal thickness and the number density distribution pattern of the carbon nanotubes.

As indicated by the plan-view observation result by a field emission scanning electron microscope illustrated in FIG. 3, the carbon nanotube device of the invention has not only the number distributions of the single-walled carbon nanotubes growing on the substrate, but also the thickness of bundles of single-walled carbon nanotubes and the way how the bundles entwine with one another changing in accordance with the nominal thickness of the catalyst substance. The diversity thereof is, however, a phenomenon which cannot be overlooked in coping with the applications of the carbon nanotube device.

For example, in depositing the catalyst substance, when a nominal thickness is adjusted within an appropriate range in such a way that the carbon nanotubes grow most thickly at the center of a pattern, the carbon nanotubes formed at the center of the pattern entwine with one another, and the carbon nanotubes can grow in the substrate vertical direction, not in the horizontal direction of the substrate surface, so that a device formed in a needle-like shape can be formed. Because the leading end of the carbon nanotube is sharp, a field emission electron source can be formed by obtaining electrical connection with the carbon nanotubes by forming a conductive layer on the surface of the substrate beforehand, and by forming a conductive electrode on the layer having the spaces with that layer serving as an insulating material. On the other hand, elimination of the layer having the spaces enables the device to be used as the probe of a scanning probe microscope and an information reading/writing device in a recording device.
(Carbon Nanotube Device and Production Process)

FIG. 1 is a diagram for explaining the process for producing a carbon nanotube device. A titanium nitride film (2) in 10 nm is formed on a silicon substrate with a thermal oxide film (1) by reactive sputtering, a silicon dioxide film (3) in 1000 nm is formed thereon by plasma CVD, and a metal chrome film (4) in 100 nm is formed by sputtering. A resist agent is applied thereon, 200 nm openings are formed by photolithography, and the chrome film is etched by 115 nm through the openings, thereby forming openings each having a 430 nm aperture at the top, and a 315 nm aperture at the bottom in the chrome film (FIG. 1-1).

Next, the silicon dioxide film is subjected to isotropic etching through the openings of the chrome film by a hydrofluoric acid solution, thereby forming the holes (5) in the silicon dioxide film. At this time, because the hydrofluoric acid solution does not dissolve titanium nitride, the titanium nitride film functions as an etch stop layer, and the surface thereof can be partially exposed (FIG. 1-2).

Thereafter, when metal cobalt is deposited by sputtering, the openings of the chrome film function as mask openings which suppress the deposition rate of cobalt, so that the patterns (6) of cobalt atoms having nominal thickness distributions are formed on the surface of the titanium nitride at the bottom portions (FIG. 1-3).

Further, when chemical vapor deposition is carried out with an alcohol vapor as a reactant, the cobalt atoms diffuse on the surface of the titanium nitride because of a high temperature of 800° C. or so which is a condition of chemical vapor deposition, thereby spontaneously forming cobalt nanoparticles having sizes according to the cobalt nominal thickness distributions.

At this time, the titanium nitride layer has a polycrystalline structure having a crystal grain size of 5 to 10 nm, and as nanoparticles are selectively formed at the grain boundaries thereof, the titanium nitride layer can function as a template which forms high density nanoparticles.

The carbon nanotubes grow with the cobalt nanoparticles serving as catalysts, and are formed in high density at the center of the cobalt catalyst pattern, and in low density at the peripheral thereof according to the size and number density distribution of the nanoparticles. The carbon nanotubes at the center entwine with one another, cannot grow in the substrate surface horizontal direction, but grow in the substrate vertical direction, thereby forming a spiny structure (7) constituted by carbon nanotube bundles (FIG. 14).

The structure in FIG. 1-4 has electrical contact with the array of the carbon nanotube bundles (7) by the titanium nitride layer (2) at the bottom surface, and has the chrome film (4) having the openings at the top. The chrome film (4) is also conductive, and the insulation property with respect to the titanium nitride layer can be ensured by the silicon dioxide layer.

As a voltage is applied between both electrodes, field emission of electrons can be efficiently performed from the spines (7) of the carbon nanotubes. The device is useful for the electrode of a field emission display, and the production process is a process which facilitates production of a field emission electron source.
(Catalyst Pattern Appropriate for Producing Device)

FIG. 2 quantitatively illustrates a cobalt catalyst pattern appropriate for producing the device in FIG. 1. To spontaneously form cobalt nanoparticles of 1 nm or so at the grain boundaries of the titanium nitride surface having a grain size of 5 nm to 10 nm, it is necessary that an average film thickness should be 0.02 nm to 0.1 nm.

According to the device structure in FIG. 1, the titanium nitride surface can have the cobalt deposition amount distribution in FIG. 2, so that a nominal cobalt thickness at the center of the pattern can be approximately 0.08 nm by depositing cobalt to be 5 nm at the outside of the mask.

On the other hand, in coming away from the center of the pattern at 1 μm or so, the film thickness of cobalt rapidly decreases, and the number of cobalt nanoparticle catalysts appropriate for growing the carbon nanotubes rapidly decreases. Because the carbon nanotubes are formed in high density at the center of the cobalt catalyst pattern, the carbon nanotubes start entwining with one another from the center, and the spiny structure grown in the vertical direction can be produced.
(Selective Growth in Vertical Direction)

FIG. 3 is a photograph illustrating single-walled carbon nanotubes formed by chemical vapor deposition as viewed from the above by a field emission scanning electron microscope. A reaction condition was 800° C., a reaction gas was a pure ethanol vapor, a reaction pressure was 1.3 kPa, and a reaction time was 10 min.

The upper portion of the figure is a photograph of a portion where a cobalt average film thickness is 0.08 nm, the single-walled carbon nanotubes are formed in high density, formed in spiny shapes, and form the bundles thereof entwine with one another. When growing is further continued, because the carbon nanotubes cannot grow in the substrate surface horizontal direction, they can be selectively grown in the substrate vertical direction.

In contrast, the bottom portion of the figure is a photograph of a portion where the cobalt average film thickness is 0.04 nm, the single-walled carbon nanotubes are formed in low density, do not form bundles thereof, and present almost isolated. Accordingly, even if the carbon nanotubes are further grown, the carbon nanotubes are not apart from the substrate, continue growing in the surface horizontal direction, and do not extend in the substrate vertical direction.

By controlling the cobalt average film thickness in this manner, the carbon nanotubes can be caused to grow in the substrate vertical diction only at the center of the cobalt catalyst pattern. The carbon nanotubes entwined with one another remain at the leading end of the spine, but the entwined portion can be eliminated by plasma etching, the end portion of the independent carbon nanotubes can appear at the leading end.

Second Embodiment

Figure 4:
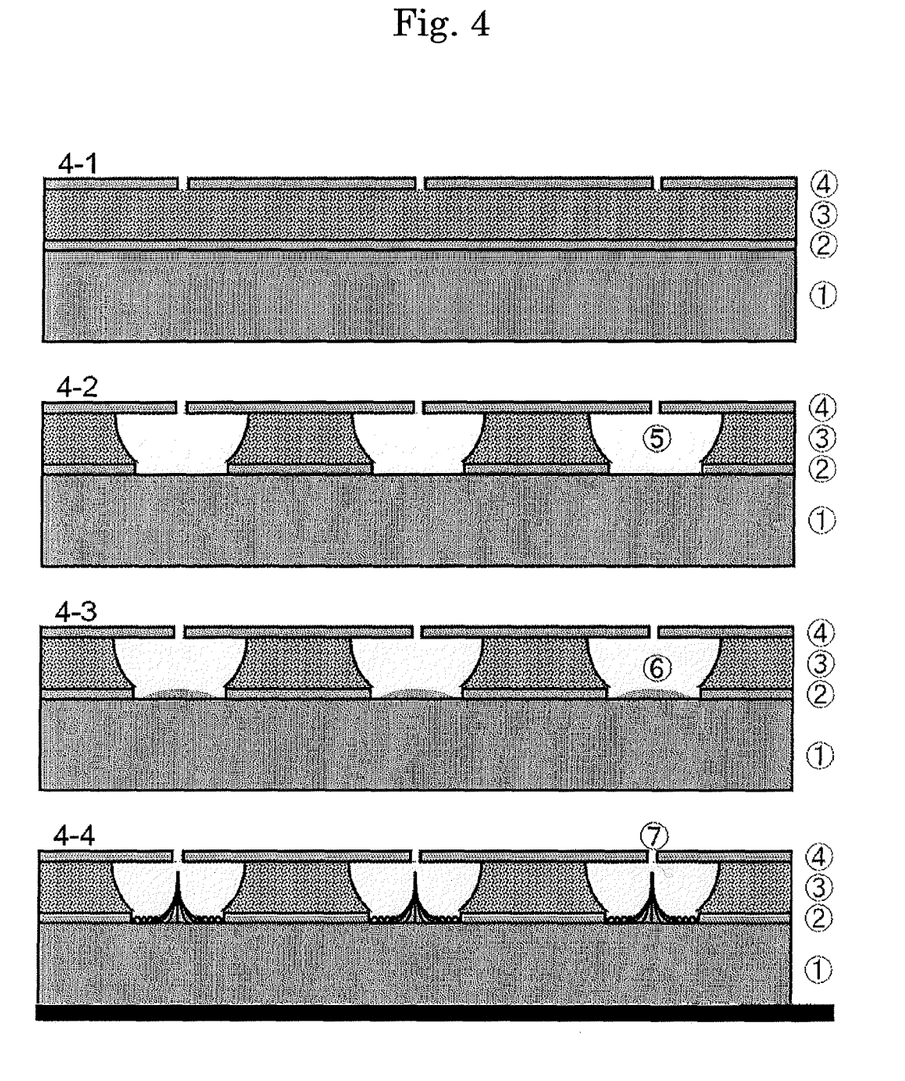
FIG. 4 A schematic diagram illustrating the production steps of carbon nanotubes.

FIG. 4 is an explanatory diagram illustrating a modified example of the foregoing embodiment. An explanation will be given with reference to this figure. A carbon nanotube device of the embodiment has the conductive film (2) formed on the substrate (1), the insulating film (3) formed thereon, and the coating film (4) formed thereon. The holes (5) in the embodiment penetrate both insulating film (3) and conductive film (2), and the substrate (1) is exposed with respect to the holes (5).

The catalyst substances (6) are used in the production steps, and the spiny single-walled carbon nanotube aggregates (7) extend from the conductive film (2) exposed with respect to the holes (5) toward the tiny openings of the coating film (4).

As typical materials, a silicon substrate with an oxide film is used for the substrate (1), an Mo film (Mo, W, or the like) is used for the conductive film (2), a silicon dioxide film is used for the insulating film (3), a conductive chrome film is used for the coating film (4), and Co, Fe, Mo, or the like is used for the catalyst substance (6).

The titanium nitride film (2) completely separates the monocrystalline silicon substrate (1) from the silicon dioxide film (3) in the foregoing embodiment, but in the embodiment, formation of the holes (5) are further proceeded, the titanium nitride film (2) is also eroded to expose the surface of the monocrystalline silicon substrate (1), and the spiny structure (7) is formed thereon.

Hereinafter, production steps will be explained.

First, the Mo film (2) having a film thickness of 100 nm (10 to 1000 nm) is formed on the silicon substrate with an oxide film (1) by sputtering or the like.

Subsequently, the silicon dioxide film (3) having a film thickness of 1000 nm (10 to 10000 nm) is formed on the Mo film (2) by plasma CVD or the like.

The chrome film (4) having a film thickness of 100 nm (10 to 1000 nm) is formed on the silicon dioxide film (3) by sputtering or the like.

Thereafter, the openings are formed in the chrome film (4) by photolithography.

The holes (5) are formed in the silicon dioxide film (3) by hydrofluoric acid solution etching through the openings of the chrome film (4). At this time, the Mo film (2) serves as an etch stop.

The Mo film (2) is etched by a hydrogen peroxide aqueous solution through the openings of the chrome film (4) and the holes (5) of the silicon dioxide film (3) and eroded, thereby exposing the substrate through the holes (5).

In this way, the substrate (1) is exposed through the openings of the chrome film (4) and the holes (5), when Mo, Co, or the like is supplied as the catalyst substance (6) by sputtering or the like through the openings and the holes, the angular profile of the catalyst substance (6) whose portion facing the opening of the chrome film (4) becomes an apex is formed in such a way that the height thereof smoothly decreases from the apex.

As mentioned, supporting the catalyst substance (6) directly on the silicon substrate (1) with the oxide film has merits such that it prevents alloying of the catalyst (6) with the conductive film (2), and catalytic activity does not deteriorate.

Further, a carbon source like an alcohol is supplied through the openings of the chrome film (4) and the holes (5). Then, single-walled carbon nanotubes are formed by chemical vapor deposition with the catalyst (6), and a spiny single-walled carbon nanotube aggregate (7) is formed on surfaces of the substrate (1) facing the hole (5). The single-walled carbon nanotube aggregate (7) and the Mo film (2) contact with each other at the side face of the hole (5) in the Mo film (2), thereby ensuring electrical conductivity.

It is known that a carbon nanotube device produced by employing such a scheme improves the performance when used as an actual field emission electron source.

Third Embodiment

Figure 5:
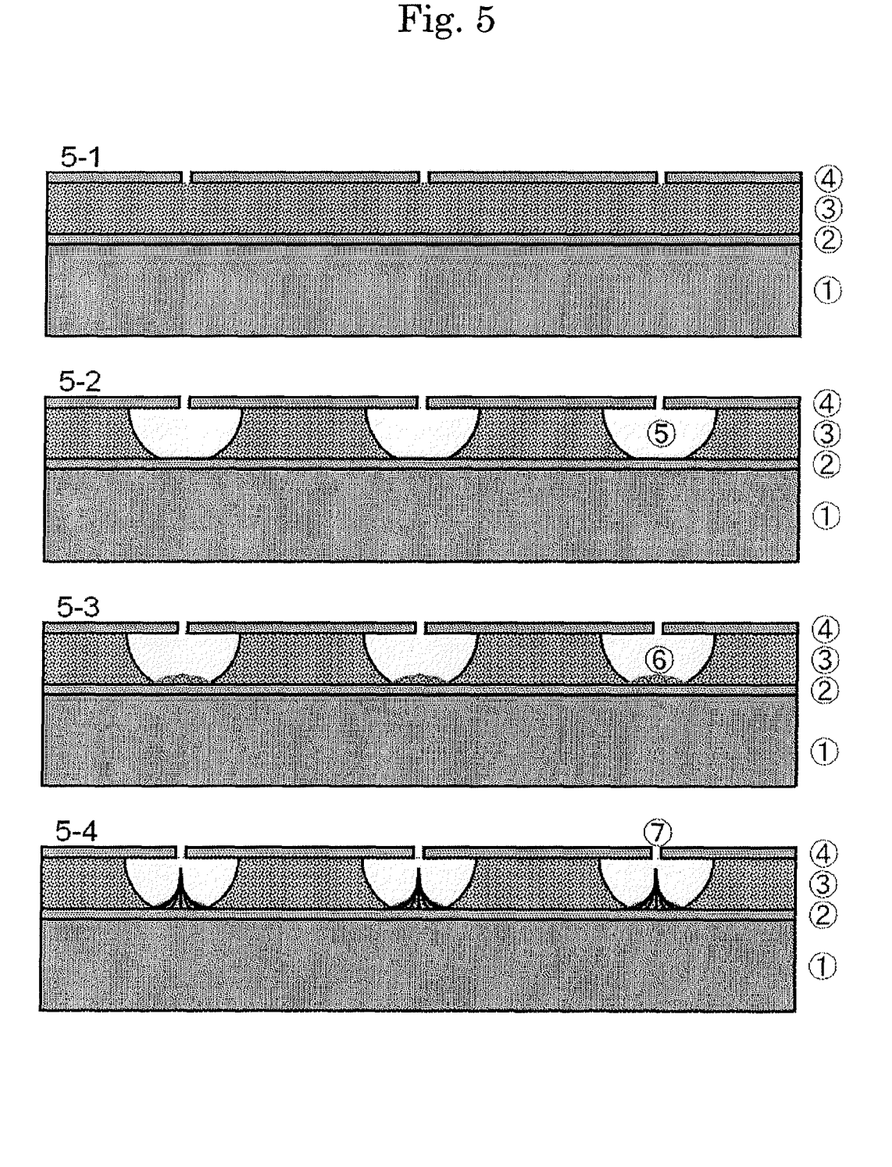
FIG. 5 A schematic diagram illustrating the production steps of carbon nanotubes.

FIG. 5 is an explanatory diagram illustrating a modified example of the foregoing embodiments. A carbon nanotube device of the embodiment has the conductive film (2) formed on the substrate (1), the insulating film (3) with the holes (5) formed thereon, and the coating film (4) formed thereon. In the production steps, the catalyst substances (6) are used, and the spiny single-walled carbon nanotube aggregates (7) extend from the conductive film (2) exposed with respect to the holes (5) toward the openings of the coating film (4).

As typical materials, a silicon substrate with an oxide film is used for the substrate (1), an Mo film (Mo, W, or the like) is used for the conductive film (2), a silicon dioxide film is used for the insulating film (3), a conductive chrome film is used for the coating film (4), and silicon dioxide and Co, Fe, Ni, Mo, or the like is used for the catalyst substance (6).

Although major part of the invention is the same as that of the embodiment illustrated in FIG. 1, the following differs. That is, after the holes (5) are formed in the silicon dioxide film (3) (FIG. 5-2), insulative materials are dispersed on the bottom portions of the holes (5), metal cobalt is deposited by sputtering, and then the patterns (6) of cobalt atoms are formed (FIG. 5-3). This will be explained in detail below.

First, the Mo film (2) having a film thickness of 100 nm (10 to 1000 nm) is formed on the silicon substrate with the oxide film (1) by sputtering or the like.

Next, the silicon dioxide film (3) having a film thickness of 1000 nm (100 to 10000 nm) is formed on the Mo film (2) by plasma CVD or the like.

Further, the chrome film (4) having a film thickness of 100 nm (10 to 1000 nm) is formed on the silicon dioxide film (3) by sputtering or the like.

Thereafter, openings are formed in the chrome film (4) by photolithography.

Subsequently, the holes (5) are formed in the silicon dioxide film (3) by hydrofluoric acid solution etching through the openings of the chrome film (4). At this time, the Mo film (2) serves as an etch stop.

Subsequently, after catalyst support substances (silicon dioxide, or aluminum oxide, magnesium oxide) are supplied through the openings of the chrome film (4) and the holes (5) by sputtering or the like, catalyst substances (Mo and Co) are further supplied. This causes catalyst supports and the catalysts (6) to be supported on the surfaces of the substrate (1) facing the holes (5) with angled distributions.

When the thickness of the catalyst support is thin like 0.3 to 3 nm, the catalyst supports form discontinuous films. That is, the catalyst supports do not cover all of the surfaces of the Mo film (2) exposed by the holes (5), some of the surfaces are directly exposed, and other surfaces are hidden by the catalyst support. This prevents deactivation originating from alloying of the catalyst with the conductive film (2) on the support substance.

Further, when a carbon source like an alcohol is supplied through the openings of the chrome film (4) and the holes (5), single-walled carbon nanotubes are formed by chemical vapor deposition with the catalyst (6), and the spiny single-walled carbon nanotube aggregates (7) are formed on the surfaces of the Mo film (2) facing the holes (5).

In this case, single-walled carbon nanotubes (7) contact a portion, not hidden by the support substance, of the surface of the Mo film (2) exposed by the hole (5). Therefore, it can electrically contact the conductive film (2) through openings in the catalyst support. Eventually, in the carbon nanotube device of the embodiment the catalyst support is present at a portion between the single-walled carbon nanotubes (7) and the Mo film (2).

Proceeding the work in this manner also makes it possible to produce the carbon nanotube device.

The present application claims a priority based on a Japanese Patent Application No. 2004-219371. The contents of the basic application are incorporated in this application if the domestic law of a designated country permits.

INDUSTRIAL APPLICABILITY

As mentioned above, according to the invention, a carbon nanotube device that has little amount of catalyst substances mixed as impurities, and a production process of efficiently searching a catalyst supporting condition for producing the carbon nanotube device are provided.

The invention claimed is:

1. A carbon nanotube device comprising:
a substrate;
an insulating layer laid on said substrate, having a space over said substrate;
a coating layer which sandwiches said insulating layer with said substrate and has a tiny opening leading to said space;
a catalyst substance laid on said substrate in said space; and
a carbon nanotube aggregate supported by said catalyst substance in said space,
and wherein
said carbon nanotube aggregate is extending from said catalyst substance and said substrate toward said tiny opening in said space,
said carbon nanotube aggregate is a spine comprised of a plurality of carbon nanotubes entwined with one another,
nominal thickness of said catalyst in said catalyst substance successively decreases according to distance from said tiny opening,
nominal thickness of said catalyst in a center of said catalyst substance facing said tiny opening is the thickest,
number density of said plurality of carbon nanotubes in said carbon nanotube aggregate successively decreases according to distance from said center of said catalyst substance,
said plurality of carbon nanotubes on said center of said catalyst substance are grown in a vertical direction with respect to said substrate; and
a leading end of said spine is sharp and adjacent to said tiny opening.

2. The carbon nanotube device according to claim 1, wherein said insulating layer comprises an insulating material, and said tiny opening is small compared to the thickness of said insulating layer.

3. The carbon nanotube device according to claim 1, wherein said carbon nanotube device is to be used for a field emission electron source,
said substrate has a conductive layer on a side contacting said insulating layer,
said coating layer is conductive, and
field emission of electrons from said leading end of said spine toward said tiny opening is performed as a voltage is applied between said conductive layer and said coating layer.

4. The carbon nanotube device according to claim 3, further comprising a catalyst support substance at a portion between said catalyst substance and said conductive layer.

5. The carbon nanotube device according to claim 1, wherein each of said plurality of carbon nanotubes is a single-walled carbon nanotube.

6. The carbon nanotube device according to claim 1, wherein
a side face of said space is formed in an axisymmetrical shape around an axis from said tiny opening to said substrate, and a size of said space decreases from said coating layer as coming close to said substrate.

7. The carbon nanotube device according to claim 1, wherein said plurality of carbon nanotubes apart from said center of said catalyst substance are grown in a horizontal direction with respect to said substrate.

8. A process for producing a carbon nanotube device, comprising:
forming an insulating layer on a substrate;
forming a coating layer on said insulating layer, said coating layer having a tiny opening;
etching said insulating layer through said tiny opening to make a space exposing a part of said substrate;
forming a catalyst body containing a catalyst substance on said substrate in said space, by supplying a diluted catalyst substance source through said tiny opening into said space, so that nominal thickness of said catalyst in said catalyst substance successively decreases according to distance from said tiny opening, and nominal thickness of said catalyst in a center of said catalyst substance facing said tiny opening is the thickest; and
supplying a carbon source through said tiny opening into said space, thereby forming a carbon nanotube aggregate supported by said catalyst substance in said space so that:
said carbon nanotube aggregate is extending from said catalyst substance and said substrate toward said tiny opening in said space,
said carbon nanotube aggregate is a spine comprised of a plurality of carbon nanotubes entwined with one another;
said plurality of carbon nanotubes on said center of said catalyst substance are grown in a vertical direction with respect to said substrate; and
number density of said plurality of carbon nanotubes in said carbon nanotube aggregate successively decreases according to distance from said center of said catalyst substance.

9. The carbon nanotube device production process according to claim 8, wherein said insulating layer having said space is formed of an insulating material, and said tiny opening is small compared to the thickness of said insulating layer.

10. The carbon nanotube device production process according to claim 8, wherein
said carbon nanotube device is to be used for a field emission electron source,
said coating layer is conductive,
said insulating layer is formed after a conductive layer is formed on a surface of said substrate, and
said carbon nanotube aggregate is formed on a surface of said conductive layer.

11. The carbon nanotube device production process according to claim 10, wherein
after said insulating layer is formed,
a catalyst support substance is formed on a portion of a surface of said conductive layer exposed to said space,
a catalyst substance is formed on said catalyst support substance,
and then a carbon source is supplied into said space, thereby forming said carbon nanotube aggregate on said conductive layer, said catalyst support substance, and said catalyst substance.

12. The carbon nanotube device production process according to claim 8, wherein each of said plurality of carbon nanotubes is a single-walled carbon nanotube.

13. The carbon nanotube device production process according to claim 8, wherein
a side face of said space is formed in an axisymmetrical shape around an axis from said tiny opening toward said substrate and which has a size decreasing as coming close to said substrate from said coating layer, in said insulating layer.

14. The carbon nanotube device production process according to claim 8, wherein said plurality of carbon nanotubes apart from said center of said catalyst substance are grown in a horizontal direction with respect to said substrate.

15. A carbon nanotube device comprising:
   a substrate;
   an insulating layer laid on said substrate, having a space which penetrates to said substrate;
   a coating layer which sandwiches said insulating layer with said substrate and has a tiny opening leading to said space;
   a catalyst substance laid on said substrate in said space; and
   a carbon nanotube aggregate supported by said catalyst substance in said space,
   and wherein
   nominal thickness of said catalyst in said catalyst substance successively decreases according to distance from said tiny opening, and
   said carbon nanotube aggregate is a spine comprised of a plurality of carbon nanotubes entwined with one another, and is extending from said catalyst substance and said substrate toward said tiny opening in said space.

16. A process for producing a carbon nanotube device, comprising:
   forming an insulating layer on a substrate;
   forming a coating layer on said insulating layer, said coating layer having a tiny opening;
   etching said insulating layer through said tiny opening to make a space exposing a part of said substrate;
   forming a catalyst substance containing a catalyst on said substrate in said space, by supplying a diluted catalyst substance source through said tiny opening into said space so that nominal thickness of said catalyst in said catalyst substance successively decreases according to distance from said tiny opening; and
   supplying a carbon source through said tiny opening into said space, thereby forming a carbon nanotube aggregate supported by said catalyst substance in said space so that said carbon nanotube aggregate is a spine comprised of a plurality of carbon nanotubes entwined with one another, and is extending from said catalyst substance and said substrate toward said tiny opening in said space.

* * * * *

UNITED STATES PATENT AND TRADEMARK OFFICE
CERTIFICATE OF CORRECTION

PATENT NO. : 8,642,126 B2  Page 1 of 1
APPLICATION NO. : 11/572665
DATED : February 4, 2014
INVENTOR(S) : Suguru Noda It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1933 days.

Signed and Sealed this

Twenty-second Day of September, 2015

Michelle K. Lee
*Director of the United States Patent and Trademark Office*